W. F. GOFF.
CENTERING RING FOR TIRE BEADS.
APPLICATION FILED DEC. 24, 1918.
1,339,451.
Patented May 11, 1920.
2 SHEETS—SHEET 1.
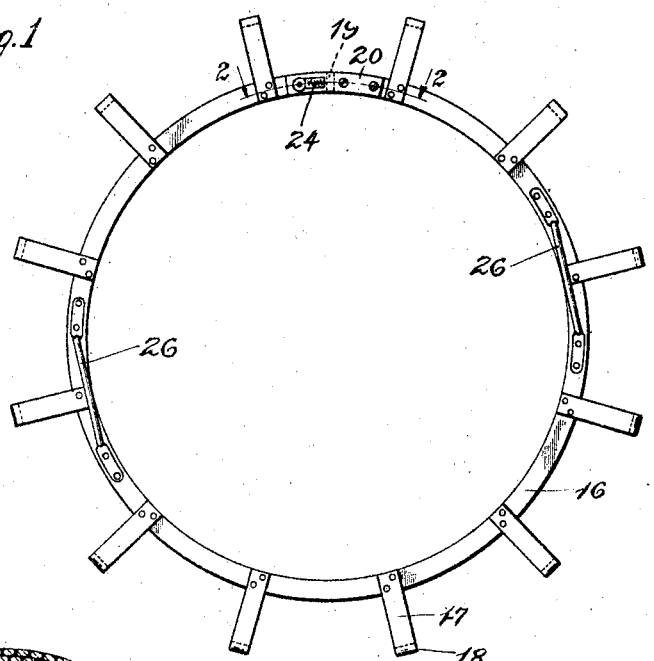
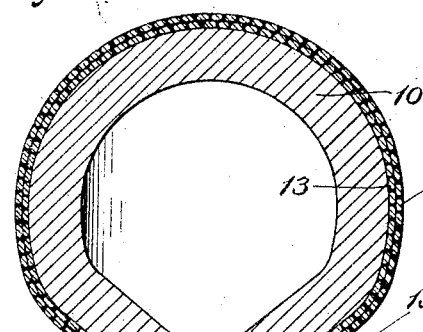
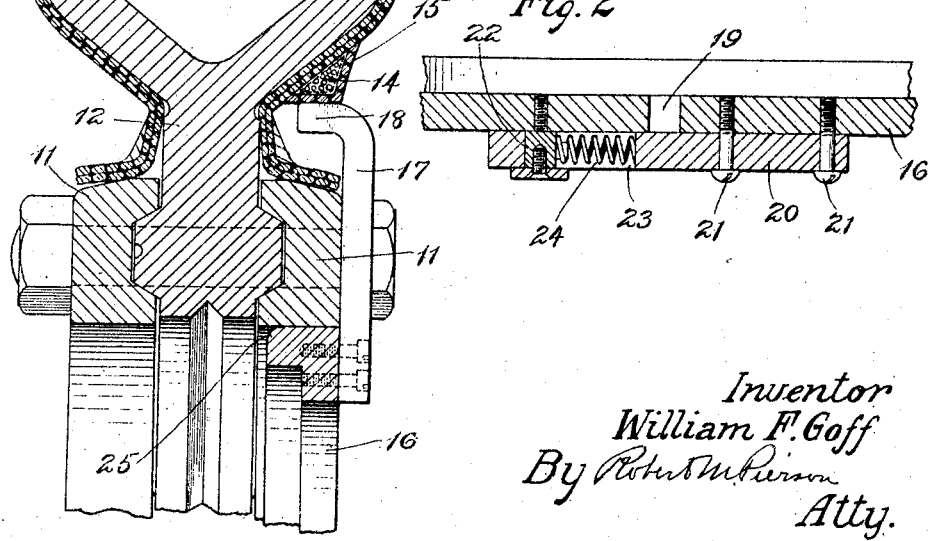
Inventor
William F. Goff
By Robert M. Pierson
Atty.

W. F. GOFF.
CENTERING RING FOR TIRE BEADS.
APPLICATION FILED DEC. 24, 1918.
1,339,451.
Patented May 11, 1920.
2 SHEETS—SHEET 2.
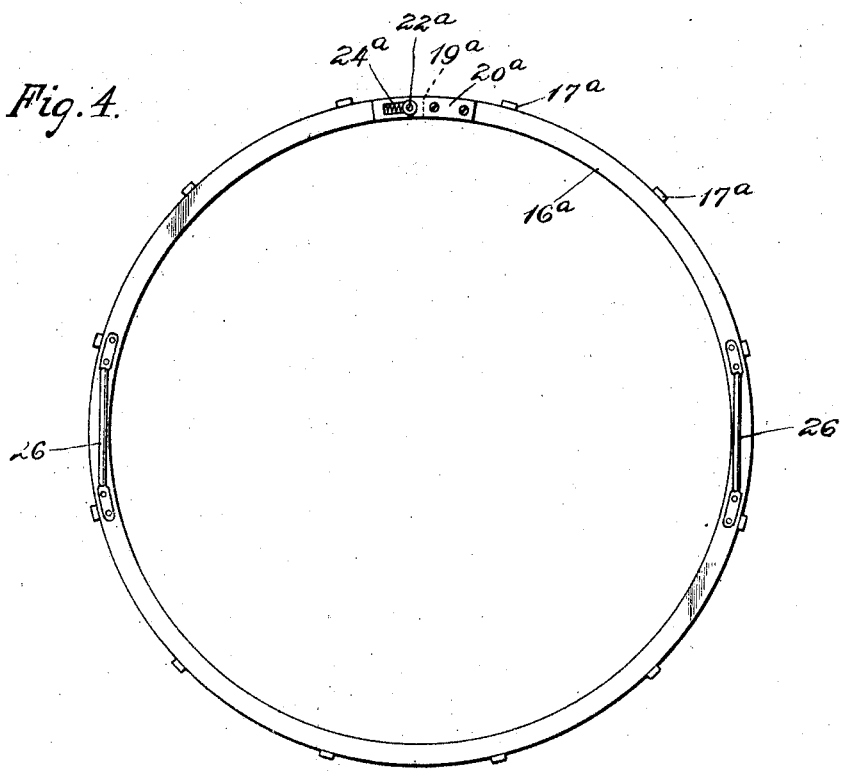
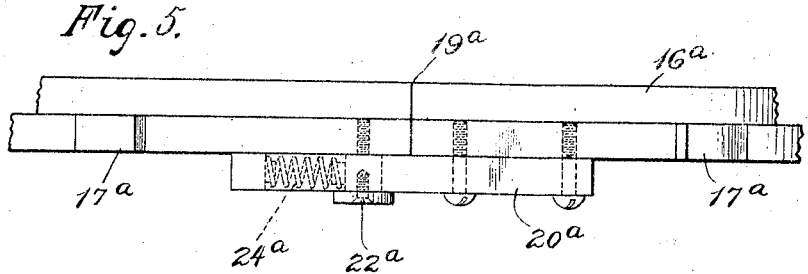
Inventor
William F. Goff
By Robert M. Pierson
Atty.

UNITED STATES PATENT OFFICE.

WILLIAM F. GOFF, OF AKRON, OHIO, ASSIGNOR TO THE B. F. GOODRICH COMPANY, OF NEW YORK, N. Y., A CORPORATION OF NEW YORK.

CENTERING-RING FOR TIRE-BEADS.

1,339,451.  Specification of Letters Patent.  Patented May 11, 1920.

Application filed December 24, 1918. Serial No. 268,119.

*To all whom it may concern:*

Be it known that I, WILLIAM F. GOFF, a citizen of the United States, residing at Akron, in the county of Summit and State of Ohio, have invented a certain new and useful Centering-Ring for Tire-Beads, of which the following is a specification.

This invention relates to the manufacture of pneumatic tire casings, and its object is to provide an improved bead-centering gage of the ring type enabling the bead core to be accurately and quickly located in a position where it may be applied to the partly-formed carcass by lateral pressure exerted in any suitable way, as by means of the operator's hands, or a roller, or both. Among the new or improved results accomplished by means of the invention is the ability to use this gage in the placing of inextensible bead cores, thus dispensing with the use of the spacing block heretofore employed.

Of the accompanying drawings,

Figure 1 is a side elevation showing a preferred form of my improved bead gage.

Fig. 2 is a section on the line 2—2 of Fig. 1 on a larger scale.

Fig. 3 is a cross-section of the tire mandrel, the gage, and a partly-formed tire, showing the mode of using the invention.

Fig. 4 is a side elevation showing a modified construction.

Fig. 5 is a plan view of the joint in this modification.

Referring at first to Figs. 1, 2 and 3, 10 indicates the tire-forming core or mandrel which may be of the usual transversely-divided type whose sections are bound together by a pair of bolted side rings 11 having tapered rib and groove engagement with the core tongue 12. 13, 13 are the two inner plies of, for instance, a four-ply cord tire carcass, laid upon the core 10 and shaped into conformity therewith. 14 is a triangular bead core of the endless, straight-side, inextensible type located in its proper position against the outer one of these two carcass plies and provided with a covering strip 15 of rubberized cord fabric on its outer and bottom or base sides. It will be understood that after the location of the two bead cores, the outer plies of carcass fabric are placed on the core 10 and shaped into conformity therewith, and the margins of all of the plies are properly brought together in order to bind the bead cores in the edges of the carcass. In Fig. 3 the margins of the inner carcass plies are shown extending a considerable distance below the position of the bead cores in order that they may later be overlapped with the margins of the outer plies.

My improved gage in its preferred form comprises a ring 16 whose outer diameter substantially equals the inner diameter of the locking rings 11 on the tire core so as to center itself by telescoping within either of said locking rings, and a series of L-shaped bead-engaging fingers or abutments 17 secured to the outer face of the ring 16 and projecting radially outward therefrom at regular intervals along the circumference of said ring. The terminal bead-engaging portions 18 of these fingers project laterally inward over the locking ring 11 in order to support the bead core 14, and their outer faces constitute separate segments of a cylinder, preferably open or exposed at their outer ends in an axial direction as shown, so that the endless, inextensible bead core may be slid thereover after the ring is in place and pressed against the side of the partially-formed tire.

The ring 16 is preferably split at one point as indicated at 19, and when it telescopes inside of the core shoulder formed by the locking ring 11, the ring 16 is arranged to contract against spring pressure, this arrangement serving to compensate for slight variations in the diameters of the core shoulders on different locking rings nominally of the same size. 20 is a short splice-bar or segment overlying the gap 19 in the ring 16 and secured by screws 21 to one end of said ring. A cap-stud 22 on the other end of the ring occupies a slot 23 in the splice-bar 20, and in said slot is a spring 24 interposed between the stud and the slot end for pushing apart the ends of the ring. The corner edge 25 of ring 16 is rounded as shown in Fig. 3 in order to permit the easy insertion of said ring within the core ring 11. Handles 26 are located at opposite points on the ring 16 at nearly equal distances from the split 19 for manipulating said ring.

In operating the gage, it is grasped by means of the handles 26 and forced into position within the core ring 11, as indicated in Fig. 3, some contraction of the gage ring against its spring 24 being generally required. This accurately locates the gage ring concentrically with the core surfaces on which the partially-formed tire is located, since the inner shoulder of the core 11 is concentric with those surfaces. The fingers 17 are of equal lengths so that their bead-engaging portions 11 are also concentric. The bead core 14 is then pushed into place by the operator's hands over the finger ends 18 and may, if desired, be further seated by a suitable rolling operation to firmly stick it in place before the gage is removed. The gage is then withdrawn, and, when the other bead core has been similarly located on the opposite side of the tire, the construction of the tire is further proceeded with in the usual way.

By providing a bead-centering gage having a concentric series of bead-engaging members separated by open spaces, which preferably are, as shown, wider in a circumferential direction than the outer ends of the fingers, the total area of contact between the gage and the bead core is greatly reduced as compared with prior forms of gages having a continuous bead-supporting surface. Heretofore, so far as I am aware, bead-placing rings or annular bead-locating gages have been employed only in connection with soft or extensible beads. Bead cores for straight-side tires are inextensible and usually straight or cylindrical on their base sides as shown in Fig. 3, and there is usually an unavoidable slight variation in the inner diameter of such cores. A common mode of placing such bead cores concentrically on a tire has, therefore, been to employ a hand spacing block inserted from point to point between the base of the bead core and the outer shoulder of the core-locking ring; or sometimes there is employed the slower method of marking a concentric gaging circle on the tire with a pair of compasses. My improved gage may be used with inextensible bead cores, as it allows for any slight variations in the diameters of said cores by merely compressing the bottom of the cover or other soft surface of the core more or less without producing an undue amount of drag or friction upon the core either in slipping the latter over the gage or in withdrawing the gage after the bead core has been stuck on the tire. The bead cores can also tend to take a slightly polygonal form on the gage and thus further compensate for their variations in size, without departing to an objectionable degree from the shape of a true circle.

In the modified form of my invention shown in Figs. 4 and 5, the gage ring 16$^a$ is adapted to telescope over the tapered outer shoulder of the core-locking ring 11, and the bead-engaging fingers or abutments 17$^a$ are of correspondingly shorter radial depth. The stud 22$^a$ in this case is located at the inner end of the slot in the splice bar 20$^a$, and the spring 24$^a$ tends to contract the gage ring.

This form is more particularly applicable to tires using short inner plies which are trimmed at the toe of the bead. The form shown in Figs. 1 to 3 is preferred as being of more universal application.

I do not claim broadly the use of a transversely-split spring bead-gage ring.

I claim:

1. A tire bead-positioning gage having a circular series of relatively widely spaced bead-base-engaging abutments exposed or unobstructed at their outer ends in an axial direction to permit an endless inextensible bead-core ring to be slid into position thereover against the side of the partially completed tire.

2. A tire bead-positioning gage having a circular series of relatively widely spaced bead-engaging surfaces forming substantially segments of a cylinder which are exposed at their outer ends in an axial direction to permit an endless inextensible bead-core ring to be slid thereover into position against the side of the tire.

3. A tire bead-positioning gage comprising a ring having means for centering it on the tire-forming core and provided with a circumferential series of spaced, radial, fixed fingers for engaging and supporting the base of the bead core, the circumferential width of the outer ends of said fingers being less than that of the spaces between them.

4. A tire bead-positioning gage comprising a transversely-split, expanding and contracting spring ring having a circumferential series of spaced fingers projecting radially outward therefrom for engaging the base of the tire bead, the circumferential width of the outer ends of said fingers being less than that of the spaces between them.

5. A tire bead-positioning gage comprising a ring adapted to telescope within an annular shoulder on the tire-forming core, and a circumferential series of spaced fingers projecting radially outward from said ring and formed with bead-engaging outer ends projecting laterally inward in an axial direction.

6. The combination of a tire-forming core having a concentric annular shoulder, a yieldingly-expansible transversely-split ring adapted to telescope within and against said shoulder in a contracted condition, and a circumferential series of L-shaped fingers projecting from said ring radially outward past said shoulder and formed with bead-engaging extremities projecting laterally inward toward the core.

In testimony whereof I have hereunto set my hand this 21st day of December, 1918.

WILLIAM F. GOFF,